United States Patent
Ledoux

(10) Patent No.: US 9,758,105 B2
(45) Date of Patent: Sep. 12, 2017

(54) VEHICULAR GUN HOLDER

(71) Applicant: Mervin Terry Ledoux, Ochre River (CA)

(72) Inventor: Mervin Terry Ledoux, Ochre River (CA)

( * ) Notice: Subject to any disclaimer, the term of this patent is extended or adjusted under 35 U.S.C. 154(b) by 0 days.

(21) Appl. No.: 15/066,845

(22) Filed: Mar. 10, 2016

(65) Prior Publication Data
US 2017/0043726 A1    Feb. 16, 2017

Related U.S. Application Data

(60) Provisional application No. 62/203,691, filed on Aug. 11, 2015.

(51) Int. Cl.
*B60R 9/00* (2006.01)
*B60R 7/14* (2006.01)

(52) U.S. Cl.
CPC ..................... *B60R 7/14* (2013.01)

(58) Field of Classification Search
CPC .................... B60R 7/14; B60R 9/00
USPC ........................ 224/539, 571, 913
See application file for complete search history.

(56) References Cited

U.S. PATENT DOCUMENTS

| | | | | |
|---|---|---|---|---|
| 2,160,182 A * | 5/1939 | Vrooman | ................ | B29C 51/10 425/389 |
| 3,767,094 A * | 10/1973 | Sikes | ........................ | B60R 7/14 108/44 |
| 4,579,263 A * | 4/1986 | Ehmke | ...................... | B60R 7/14 224/275 |
| 4,922,642 A * | 5/1990 | Ohlhauser | ................. | B60R 7/14 211/64 |
| 5,443,191 A * | 8/1995 | Jorgenson | ................. | B60R 7/14 211/64 |
| 5,615,815 A * | 4/1997 | Hogan | ...................... | B60R 7/04 211/60.1 |
| 5,799,850 A * | 9/1998 | Ryder | ...................... | B60R 7/14 224/42.11 |
| 5,833,102 A * | 11/1998 | Jacobson | .................. | B60R 7/14 211/64 |
| 2014/0299643 A1* | 10/2014 | Forgione | ................... | B60R 7/02 224/539 |

* cited by examiner

*Primary Examiner* — Adam Waggenspack
*Assistant Examiner* — Lester L Vanterpool
(74) *Attorney, Agent, or Firm* — Ryan W Dupuis; Kyle R. Satterthwait; Ade & Company Inc

(57) ABSTRACT

A gun holder supports a gun having an elongate barrel within a passenger vehicle having a foot space. The holder includes a floor mat configured to lay within the foot space of the passenger vehicle and a barrel support cup supported on the floor mat to locate the end of the barrel of the gun therein. More particularly the barrel support cup includes a perimeter wall protruding upwardly from the floor mat so as to define a hollow receptacle for partially receiving the end of the barrel of the gun therein such that the wall at least partially surrounds the end of the barrel of the gun within the barrel support cup and the barrel of the gun is at least partially restricted from sliding along an upper surface the mat in substantially all directions.

17 Claims, 4 Drawing Sheets

VEHICULAR GUN HOLDER

This application is claims the benefit under 35 U.S.C. 119(e) of U.S. provisional application Ser. No. 62/203,691, filed Aug. 11, 2015.

FIELD OF THE INVENTION

The present invention relates to a gun holder for supporting the barrel of a gun relative to a foot space within a passenger motor vehicle, and more particularly the present invention relates to a vehicular floor mat including a cup for receiving the end of the barrel of the gun therein during transport.

BACKGROUND

When transporting guns with elongate barrels, for example a hunting rifle, in a passenger motor vehicle, it is common for a passenger of the vehicle to position the gun such that the open end of the barrel is resting in the foot space of the vehicle with the gun extending generally upwardly therefrom to rest against the upper leg and/or passenger seat of the vehicle. In this instance the open end of the barrel may collect undesirable debris from the foot space in the vehicle. Alternatively the end of the barrel may slide along the floor of the vehicle during movement of the vehicle across the ground, resulting in subsequent unsafe placement of the gun.

SUMMARY OF THE INVENTION

According to one aspect of the invention there is provided a gun holder for supporting a gun having an elongate barrel within a passenger vehicle having a foot space, the holder comprising:

a floor mat configured to lay within the foot space of the passenger vehicle; and a barrel support cup including at least one wall protruding upwardly from the floor mat so as to define a hollow receptacle which is adapted to at least partially receive an end of the barrel of the gun therein such that said at least one wall at least partially surrounds the barrel of the gun within the hollow receptacle.

By providing a gun holder having a floor mat which lays within the foot space of the passenger vehicle, together with a barrel support thereon, a user can support their gun in the usual manner such that the open end of the barrel is supported generally on the floor of the vehicle, but in this instance i) the open end of the barrel is isolated from debris on the remainder of the floor of the vehicle, and ii) the gun is more safely supported such that the barrel is prevented from sliding along the floor into an unsafe position.

Preferably the barrel support cup is arranged to at least partially restrict sliding movement of the end of the barrel of the gun along the mat in substantially all directions.

Preferably the bottom of the cup for supporting the end of the barrel thereon is recessed in height relative to an upper face of the floor mat.

More particularly, the cup may include a floor for supporting the end of the barrel thereon, a front wall extending up from a front side of the floor, a rear wall extending up from a rear side of the floor rearward of the front wall to receive the end of the barrel longitudinally between the front and rear walls, and a pair of side walls extending up from the floor at laterally opposing sides of the cup between the front and rear walls so as to receive the end of the barrel laterally between the side walls.

Preferably the cup and the mat are formed of an identical resilient material, for example rubber.

In one embodiment, the cup includes a laterally oriented front wall extending upwardly at a rearward slope relative to the mat and at least two spaced apart side walls extending rearwardly from the front wall at laterally spaced apart locations such that an opening of the receptacle defined between rear edges of the two side walls is oriented in an upright plane.

In this instance, there may be provided a plurality of barrel support cups supported on the mat in series with one another in a row spanning across the mat, in which each cup is defined between a respective pair of side walls extending rearwardly from the front wall.

In the preferred embodiment, the cup and the mat are integrally formed as a single, seamless, unitary, body of material.

According to a second embodiment, the barrel support cup may be readily releasable from the mat. In this instance, the floor mat may include a mounting aperture therein such that the barrel support cup can extend upwardly through the aperture from a base portion below the floor mat to the open top and spaced above the floor mat. The base portion may comprise a perimeter flange lying in a flat plane having a diameter which is greater than the mounting aperture.

The floor mat may further include a plurality of mounting apertures at spaced apart positions therein with the barrel support cup being arranged to be received in either one of the mounting apertures in a mounted position in which a base portion of the barrel support cup is supported below the floor mat and the perimeter wall extends upwardly through the aperture to the open top and above the floor mat.

A plurality of barrel support cups may be available which are different in configuration, but which are arranged to be interchangeably received in one or more corresponding mounting apertures in the floor mat.

According to the second embodiment, the perimeter wall of the barrel support cup may be tubular about a longitudinal axis which projects generally perpendicularly upwardly from the floor mat to a top edge of the perimeter wall lying in a plane which is non-parallel to the floor mat. Alternatively, the perimeter wall of the barrel support cup may be tubular about a longitudinal axis which projects upwardly at a non-perpendicular slope relative to the floor mat. According to a further alternative, a lower portion of the perimeter wall may be secured relative to the floor mat and an upper portion of the perimeter wall of the barrel support cup may be tubular about a longitudinal axis such that a direction of the longitudinal axis of the upper portion is angularly adjustable relative to the lower portion secured to the floor mat.

The barrel support cup may be rotatable relative to the floor mat about an upright axis oriented perpendicularly to the floor mat according to the second embodiment.

The bottom wall of the cup may have a drain aperture formed therethrough.

According to another aspect of the present invention there is provided a method of supporting a gun having an elongate barrel within a passenger vehicle having a foot space, the method comprising:

providing a gun holder comprising a floor mat and a barrel support cup including at least one wall protruding upwardly from the floor mat so as to define a hollow receptacle;

laying the floor mat within the foot space of the passenger vehicle; and inserting at least a portion of an end of the barrel of the gun into the hollow receptacle such that said at least one wall at least partially surrounds the barrel of the gun within the hollow receptacle.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
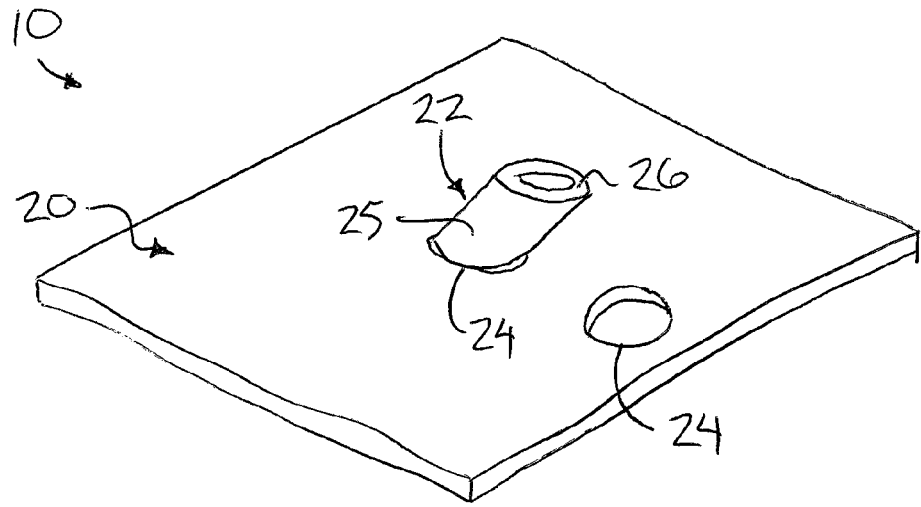
FIG. 1 is a perspective view of the gun holder according to a first embodiment of the present invention.
Figure 2:
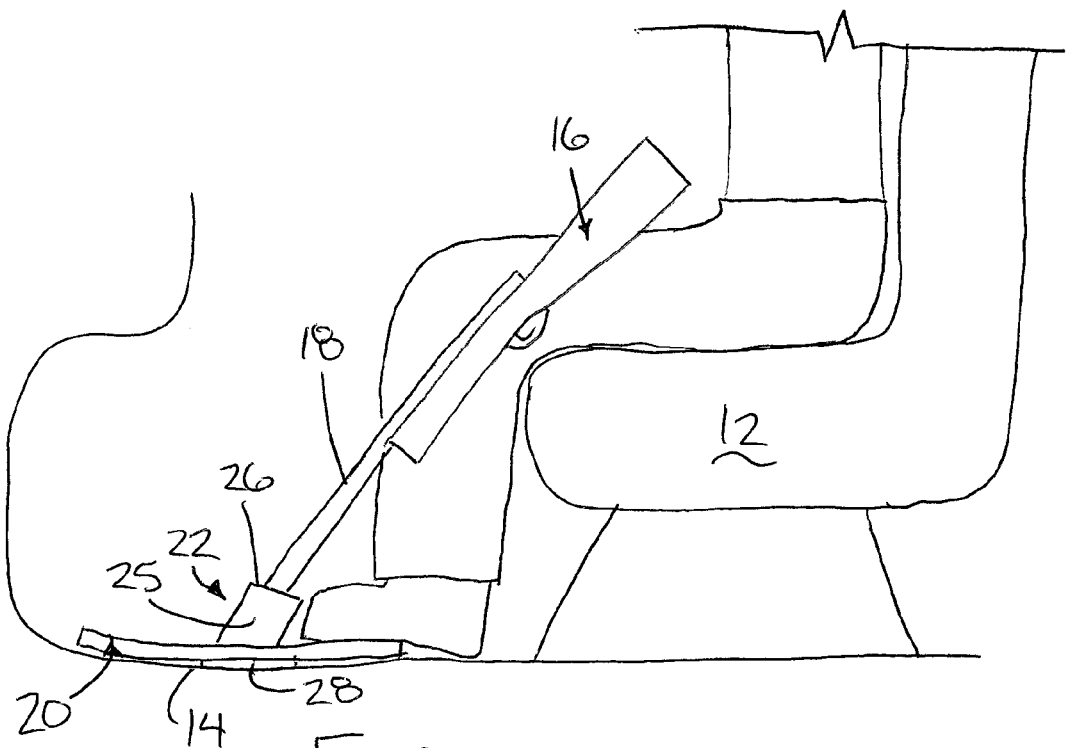
FIG. 2 is a side elevational view of the gun holder supporting the open end of a gun barrel therein within the foot space of a passenger vehicle according to the first embodiment of FIG. 1.
Figure 3:
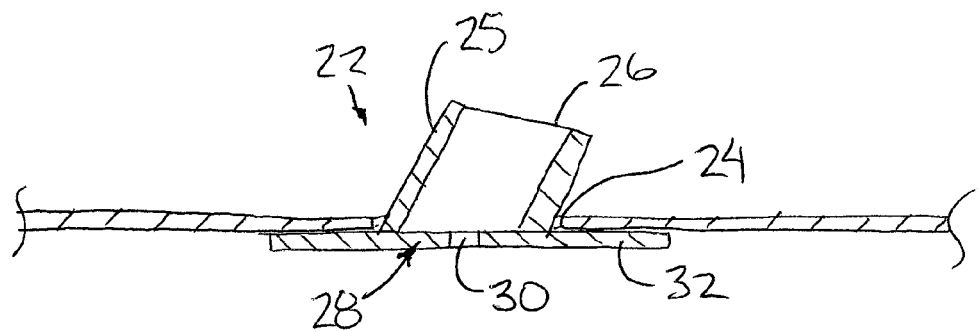
FIG. 3 is a sectional view through the barrel support cup of the gun holder according to the first embodiment of FIG. 1.
Figure 4:
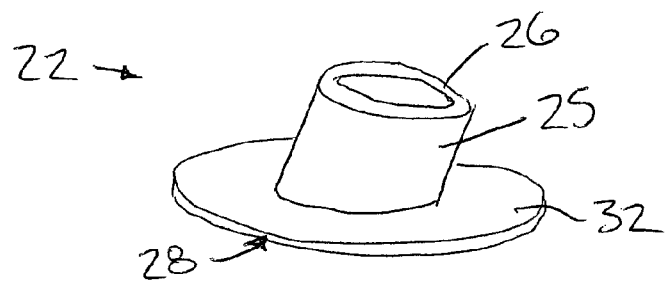
FIG. 4 is a perspective view of the barrel support cup according to the first embodiment of FIG. 1.

Referring to the accompanying figures there is illustrated a vehicular gun holder generally indicated by reference numeral 10.

The gun holder is well suited for use with a passenger motor vehicle having a passenger seat 12 with an accompanying foot space 14 for receiving the feet of a passenger seated on the seat 12. The holder serves to support a gun 16 of the type having an elongate barrel 18, for example a rifle. More particularly the holder receives the end of the barrel 18 therein and assists in locating the end of the barrel relative to the foot space 14 of the vehicle.

Although various embodiments are shown in the accompanying figures, in all instances the holder 10 generally includes a mat 20 for laying within the foot space of the vehicle and at least one barrel support cup 22 protruding upwardly from the mat to at least partially surround and at least partially receive the open end of the barrel of the gun 16 therein.

The mat 20 is a flat, rectangular, planar body of flexible, resilient material, for example a recycled rubber, or a vulcanized rubber. A suitable sized mat may be 12"×14" in size, or 14"×14" for example. The flexible nature of the mat ensures that the mat can somewhat conform to a non-planar shape of the floor of the vehicle within the foot space.

Typically the barrel support cup 22 includes one or more wall(s) protruding upwardly from the floor mat so as to define a hollow receptacle which is adapted to at least partially receive an end of the barrel of the gun therein such that the one or more wall(s) at least partially surround the barrel of the gun within the hollow receptacle. The barrel support cup may thus be arranged to restrict sliding movement of the end of the barrel of the gun along the mat in substantially all directions.

Turning initially to the embodiments of FIGS. 1 through 6, the holder 10 in these instances is typically provided with a plurality of the barrel supports in the form of cups 22 which are interchangeable with one another and which are different in configuration from one another, for example being different in size to be suited for different gun barrel diameters respectively. The mat is also provided with a plurality of different mounting locations therein, each defined by a respective mounting aperture 24 extending through the mat between the top and bottom sides thereof. Any one of the barrel support cups can be mounted within any one of the plurality of mounting locations. In the illustrated embodiment one mounting aperture 24 is centrally located within the mat and an alternative mounting aperture 24 is located laterally offset towards one side edge of the mat while being longitudinally centred between opposing ends of the mat.

Although various embodiments of the barrel support cups are shown in the accompanying figures, the common features of the various embodiments of FIGS. 1 through 6 will first be described.

In each instance, the barrel support cup includes a generally cylindrical perimeter wall 25 surrounding a hollow interior of the cup. The perimeter wall is supported at the respective mounting location to extend upwardly from the top side of the mat to an open top end of the cup which is bound by a top edge 26 of the perimeter wall at a location spaced above the top of the mat. Each cup further includes a base portion 28 in the form of a flat planar body spanning the bottom end of the perimeter wall 25. The base portion does defines a bottom wall enclosing the bottom end of the perimeter wall 25.

A drain aperture 30 is located within the bottom wall portion of the base portion to allow any fluid collected within the barrel support cup to be drained downwardly through the bottom to a location below the mat.

The base portion 28 is larger in diameter than the perimeter wall 25 such that an outer portion of the base portion protrudes radially outward from the perimeter wall 25 about the full circumference thereof to define a flange portion 32 lying in a common plane with the bottom wall. The flange portion 32 is suited for being received below the mat when the perimeter wall extends upwardly through a selected mounting aperture 24 in the mat.

The outer diameter of all of the interchangeable cups within a given set of cups is identical and corresponds to the inner diameter of the mounting aperture is 24 so as to provide lateral support to locate each cup in fixed relation to the mat in a mountain position. The inner diameter of the tubular perimeter wall 25 of all of the cups 22 within a given interchangeable set of cups vary relative to one another such that each cup 22 is suited for a particular size of outer diameter of the gun barrel. For example the interior diameter may range between a ½ an inch and 2½ inches, but more preferably the interior diameter ranges between ¾ of an inch and 2 inches among the different cups.

Turning now to the embodiment of FIGS. 1 through 4, the perimeter wall in this instance is generally cylindrical about a longitudinal axis which extends upwardly from the planar base portion below the planar mat at an angular slope which is non-perpendicular to either one of the base portion or the mat. The top edge 26 in this instance is circular and lies in a plane which is perpendicular to the longitudinal axis but which is sloped and non-parallel relative to the base portion and the mat. Once mounted in a respective mounting aperture 24 of the mat, the cup remains rotatable about a vertical axis of the aperture relative to the mat to allow the direction of angular offset of the cup to be selected by the user.

Figure 5:
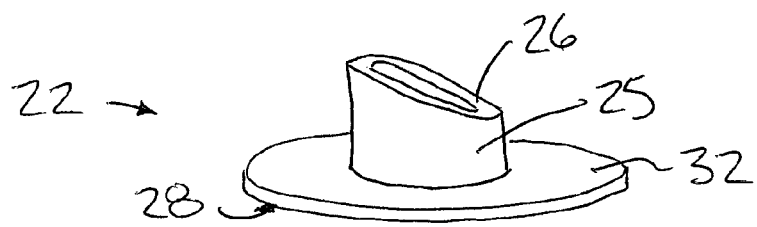
FIG. 5 is a perspective view of a second embodiment of the barrel support cup.

Turning now to the embodiment of FIG. 5, the perimeter wall in this instance is again cylindrical about a longitudinal axis; however, the longitudinal axis is oriented perpendicularly to the base portion and the mat receiving the cup therein. The top edge 26 of the perimeter wall and this instance is cut at an angle relative to the base portion such that the top edge 26 lies in a common plane which is nonparallel to the base portion and the floor mat. Again the cup remains rotatable about a vertical axis of the mounting aperture 24 to allow the direction of the angularly sloped top opening to be selected by the user.

Figure 6:
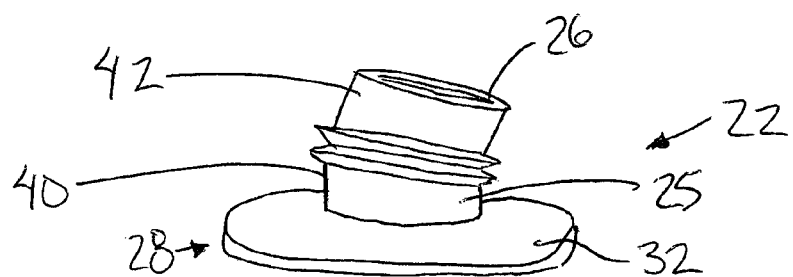
FIG. 6 is a perspective view of a third embodiment of the barrel support cup.

Turning now to the embodiment of FIG. 6, the perimeter wall 25 in this instance includes a lower portion 40 which is cylindrical about an upright axis perpendicular to the base portion, and an upper portion 40 to join to the lower portion which is cylindrical about a second longitudinal axis which is angularly offset from the longitudinal axis of the lower portion. More particularly the upper portion is joined to the lower portion such that the upper portion can be flexed relative to the lower portion and the longitudinal axis of the upper portion can be angularly adjusted relative to the lower portion and the base portion supported in fixed relation to the floor mat.

According to further embodiments of the barrel support cups 22 of FIGS. 1 to 6 various additional means may be provided to optimize the orientation of the cup to receive the end of a gun barrel therein such that the gun is permitted to extend upwardly at an angular slope which is non-perpendicular to the floor of the vehicle such that the opposing end of the gun may rest against the leg and/or passenger seat of the vehicle.

According to the embodiments of FIGS. 1 to 6, a user initially selects the desired configuration of barrel support cup 22 having an interior diameter which closely matches the outer diameter of the open end of the barrel of the gun. The selected barrel support cup 22 is then inserted upwardly through the selected mounting aperture 24 such that the flanged portion 32 of the cup lies flat against the bottom side of the floor mat and the perimeter wall protrudes upwardly through the aperture 24 to the open top end of the cup located spaced above the mat. The mat 20 is then laid along the floor of the vehicle within the foot space of a passenger. The end of the barrel is then received within a hollow interior of the cup which is surrounded by the perimeter wall 25 by inserting the barrel through the open top end of the cup until the end of the barrel abuts the bottom wall of the cup. The gun is then permitted to rest at an upward inclination against the leg of the user and/or the seat of the vehicle.

Figure 7:
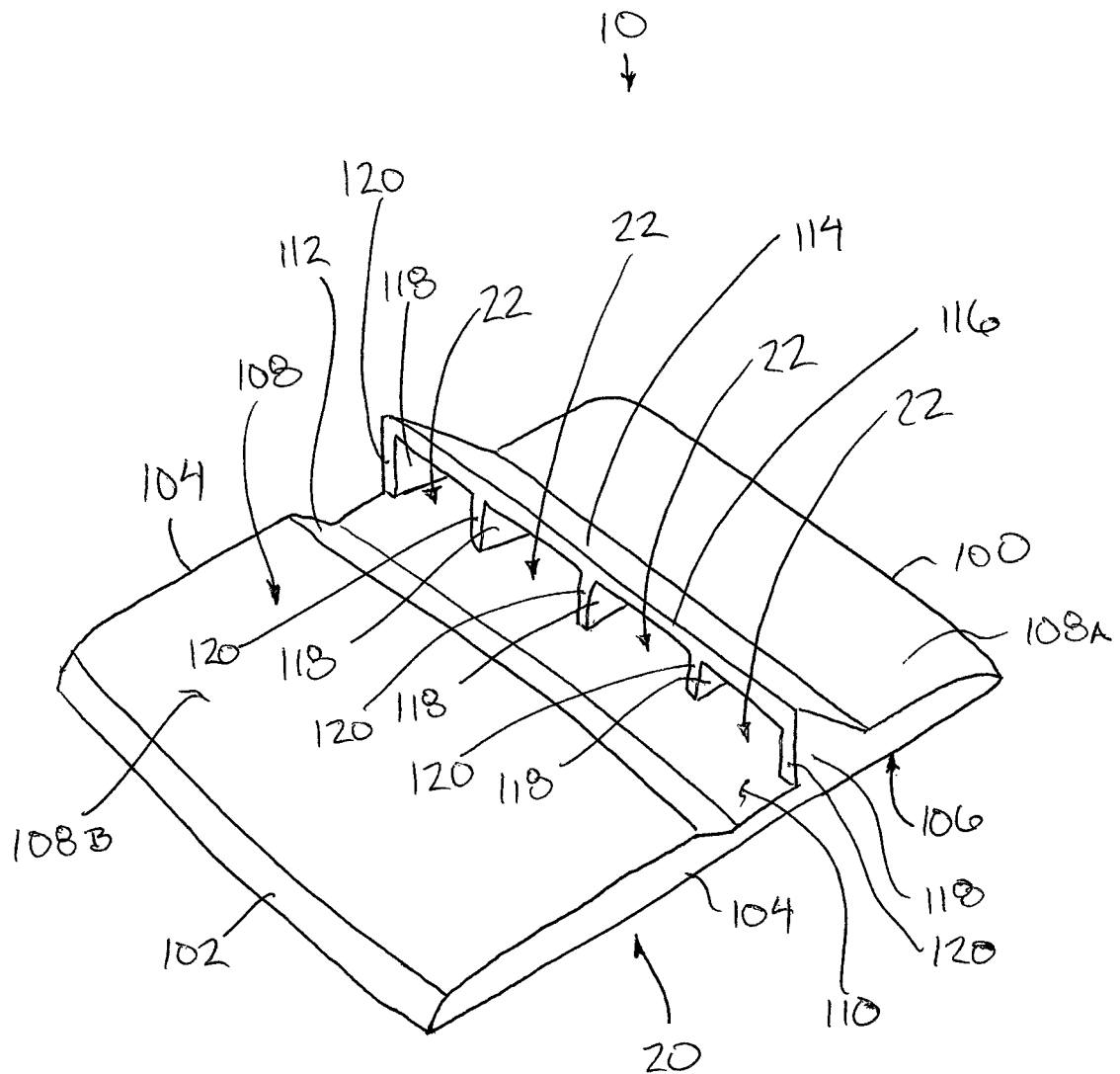
FIG. 7 is a perspective view of a further embodiment of the gun holder.
Figure 8:
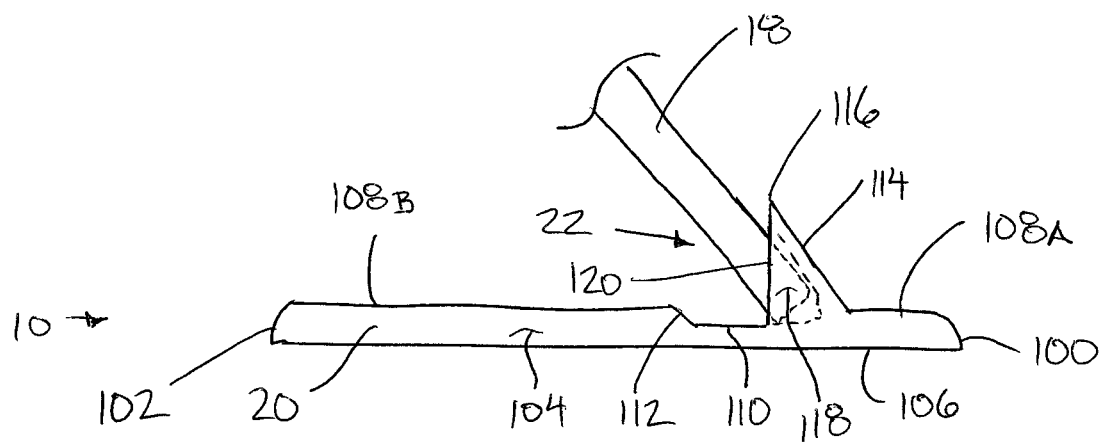
FIG. 8 is a side elevational view of the gun holder according to the embodiment of FIG. 7.
Figure 9:
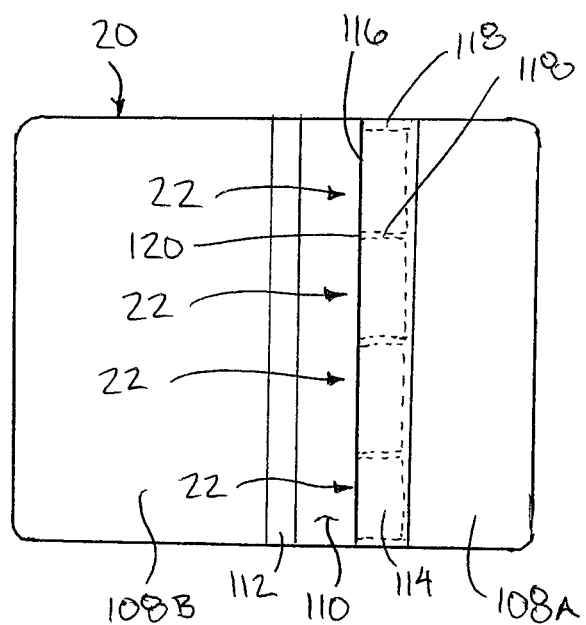
FIG. 9 is a top plan view of the gun holder according to the embodiment of FIG. 7.

Turning now more particularly to a preferred embodiment shown in FIGS. 7 to 9, there is provided a plurality of barrel support cups 22 supported on the mat 20 in series with one another in a single laterally oriented row spanning across a full width of the mat.

The mat 20 in this instance extends in a longitudinal direction between a front edge 100 and opposing the rear edge 102 which is parallel to the front edge and longitudinally opposed therefrom. The mat further includes two laterally spaced apart side edges 104 extending in the longitudinal direction between the front edge and the rear edge respectively. The bottom surface 106 of the mat is flat and rectangular in shape. A main portion 108 of the upper surface is flat and parallel to the bottom surface 106. The main portion includes a forward portion 108A adjacent the front edge and a rearward portion 108B adjacent the rear edge in which the forward and rearward portions lie in a generally common plane, longitudinally spaced apart from one another.

The row of cups 22 include a common floor 110 having a flat upper surface parallel to the bottom surface 106 but recessed in height relative to the upper surface of the main portion 108. The row of cups and the common floor 110 of the cups are positioned longitudinally between the forward portion 108A and the rearward portion 108B of the upper surface of the mat portion. The common floor 110 effectively forms a trough spanning laterally across the full width of the mat 20 between the two opposed side edges 104 such that the ends of the trough remain open to allow fluid accumulated on the floor of the row of cups 22 to drain laterally outward towards the opposing side edges of the mat.

The upper surface of the mat 20 is stepped upwardly from the rear end of the common floor area 110 to the rearward portion 108B of the upper surface by a rear wall 112 in common with all of the cups 22 of the holder according to the second embodiment. More particularly the rear wall 112 extends upwardly and rearwardly from a rear edge of the common floor area 110 to the rearward portion 108B of the upper surface of the mat across the full width of the mat 20 in the lateral direction.

A front wall 114 common to all of the cups 22 of the holder extends upwardly and rearwardly from the front edge of the common floor area 110 at a location spaced forward from the rear wall 112. The front wall 114 extends laterally across the full width of the mat 20 between the laterally opposed side edges thereof to extend upwardly and rearwardly from the forward portion 108A of the upper surface at a slope of approximately 50° to 60° from the horizontal plane of the mat according to the illustrated embodiment. The front wall extends upwardly to a top edge 116 of the front wall at a location which is spaced above the main portion of the upper surface of the mat at an intermediate location between front and rear edges of the common floor area 110 of the mat.

A plurality of parallel and laterally spaced apart side walls 118 are integrally formed with the front wall 114 and the floor 110 to protrude rearwardly from the front wall along a full height of the front wall between the top edge 116 and the floor 110. Each side wall 118 is generally triangular in shape so as to extend rearwardly from the front wall 114 to terminate at a respective rear edge 120 which is substantially vertically oriented so as to be generally perpendicular to the horizontal plane of the mat 20. In the illustrated embodiment, two outermost ones of the sidewalls 118 are located directly adjacent the laterally opposed side edges of the mat 20, and three intermediate sidewalls 118 are provided at evenly spaced apart positions in the lateral direction between the two side edges. Each adjacent pair of the sidewalls 118 effectively defines a respective barrel support cup therebetween such that there are four barrel support cups 22 in total in the laterally oriented row. The four barrel support cups are substantially identical in shape and dimension to one another. The effective opening of each cup lies generally in a vertically and laterally oriented plane spanning between the rear edges 120 of the two sidewalls 118 defining the respective cup 22.

According to the second embodiment of FIGS. 7 through 9, the mat 20 and the plurality of barrel support cups 22 in this instance comprise a single, unitary, seamless, integrally moulded body formed of resilient material, for example a vulcanized rubber, or a recycled rubber product.

The holder 10 according to the second embodiment of FIGS. 7 through 9 is used in a similar manner as the first embodiment described above in that the mat 20 is laid flat against the floor of a vehicle within the passenger foot space of the vehicle. Typically the mat is oriented with the front edge positioned forwardly of the rear edge relative to the forward working direction of the vehicle. The openings of the barrel support cups 22 are thus oriented to face rearwardly relative to the working direction of the vehicle. The user typically inserts the open end of the barrel into a selected one of the barrel support cups 22 such that the end of the barrel is abutted against the rear inner surface of the front wall 114 and rests on the upper surface of the common floor area 110 of the holder 10. The end of the barrel is effectively resisted from sliding movement along the upper surface of the mat 20 and substantially all directions by the front wall forward of the barrel of the gun, two of the sidewalls 118 of the respective cup 22 receiving the barrel therein at laterally opposed sides of the barrel, and a respective portion of the rear wall 112 rearward of the barrel of the gun. The user selects which barrel support cup 22 receives the end of the barrel therein according to whichever resulting orientation of the gun is the most stable when the opposing end of the gun leans against the seat and/or one or more legs of the user seated in a passenger seat of the vehicle.

Since various modifications can be made in my invention as herein above described, it is intended that all matter contained in the accompanying specification shall be interpreted as illustrative only and not in a limiting sense.

The invention claimed is:

1. A gun holder for supporting a gun having an elongate barrel within a passenger vehicle having a foot space, the holder comprising:
    a floor mat configured to lay within the foot space of the passenger vehicle, the floor mat having an upper surface spanning in a longitudinal direction between a front edge and an opposing read edge of the floor mat and spanning in a lateral direction between opposing side edges of the floor mat that extend longitudinally between the front edge and the rear edge respectively;
    a trough formed in the floor mat and having a floor which is recessed in height relative to the upper surface of the floor mat, the trough spanning laterally across a full width of the floor mat between the two opposing side edges such that laterally opposing ends of the trough remain open to allow fluid accumulated on the floor to drain laterally outwardly through the side edges of the floor mat;
    the trough further comprising a rear wall extending upwardly from a rear edge of the floor laterally across the full width of the floor mat and a front wall extending upwardly from a front edge of the floor laterally across the full width of the floor mat;
    the front wall protruding upwardly beyond the upper surface of the floor mat to a top edge that is spaced above the upper surface of the floor mat; and
    two or more side walls protruding upwardly from the floor of the trough in which each side wall is joined to the front wall to extend rearwardly therefrom to a rear edge of the side wall which remains spaced forwardly of the rear wall of the trough so as to define a hollow receptacle between each adjacent pair of the side walls that functions as a barrel support cup which is adapted to at least partially receive an end of the barrel of the gun therein such that the barrel support cup at least partially surrounds the barrel of the gun within the hollow receptacle.

2. The gun holder according to claim 1 wherein the barrel support cup is arranged to restrict sliding movement of the end of the barrel of the gun along the mat in all directions.

3. The gun holder according to claim 1 wherein (i) the front wall extends upwardly at a rearward slope relative to the mat such that the top edge of the front wall is located at an intermediate location between the front and rear edges of the trough, (ii) the side walls are triangular in shape, and (iii) the rear edges of the side walls are perpendicular to the upper surface of the floor mat, such that an opening of each barrel support cup that is defined between the rear edges of the two respective side walls is oriented in a vertical plane.

4. The gun holder according to claim 1 wherein the cup and the mat are formed of an identical resilient material.

5. The gun holder according to claim 4 wherein the cup and the mat are formed of rubber.

6. The gun holder according to claim 4 wherein the cup and the mat are integrally formed as a single, seamless, unitary, body of material.

7. The gun holder according to claim 4 wherein there is provided a plurality of barrel support cups supported on the mat in series with one another in a row spanning across the mat.

8. The gun holder according to claim 1 wherein the rear wall of the trough extends upwardly from the floor of the trough and terminates at a top edge at the upper surface of the floor mat.

9. A gun holder for supporting a gun having an elongate barrel within a passenger vehicle having a foot space, the holder comprising:
    a floor mat configured to lay within the foot space of the passenger vehicle; and
    a barrel support cup including at least one wall protruding upwardly from the floor mat so as to define a hollow receptacle which is adapted to at least partially receive an end of the barrel of the gun therein such that said at least one wall at least partially surrounds the barrel of the gun within the hollow receptacle;
    wherein the barrel support cup is readily separable from the floor mat; and
    wherein the floor mat includes a mounting aperture therein and the barrel support cup extends upwardly through the aperture from a base portion below the floor mat to the open top and spaced above the floor mat.

10. The gun holder according to claim 9 wherein the base portion comprises a perimeter flange lying in a flat plane having a diameter which is greater than the mounting aperture.

11. The gun holder according to claim 9 wherein the floor mat includes a plurality of mounting apertures at spaced apart positions therein and wherein the barrel support cup is arranged to be received in either one of the mounting apertures in a mounted position in which a base portion of the barrel support cup is supported below the floor mat and the perimeter wall extends upwardly through the aperture to the open top and above the floor mat.

12. The gun holder according to claim 9 further comprising a plurality of barrel support cups which are different in configuration, wherein the floor mat includes at least one mounting aperture therein arranged to receive the barrel support cups interchangeably therein.

13. The gun holder according to claim 9 wherein the perimeter wall of the barrel support cup is tubular about a longitudinal axis which projects generally perpendicularly upwardly from the floor mat to a top edge of the perimeter wall lying in a plane which is non-parallel to the floor mat.

14. The gun holder according to claim 9 wherein the perimeter wall of the barrel support cup is tubular about a longitudinal axis which projects upwardly at a non-perpendicular slope relative to the floor mat.

15. The gun holder according to claim 9 wherein a lower portion of the perimeter wall is secured relative to the floor mat and an upper portion of the perimeter wall of the barrel support cup is tubular about a longitudinal axis in which a direction of the longitudinal axis of the upper portion is angularly adjustable relative to the lower portion secured to the floor mat.

16. The gun holder according to claim 9 wherein the barrel support cup is rotatable relative to the floor mat about an upright axis oriented perpendicularly to the floor mat.

17. The gun holder according to claim 9 wherein the barrel support cup includes a bottom wall having a drain aperture formed therethrough.

* * * * *